United States Patent [19]

Ujihara et al.

[11] Patent Number: 4,689,550

[45] Date of Patent: Aug. 25, 1987

[54] METHOD FOR ADJUSTING AN ELECTRONIC CIRCUIT

[75] Inventors: Tsunenobu Ujihara; Takamichi Mitsuhashi; Takehiko Ueno, all of Tokyo, Japan

[73] Assignee: Sony Corporation, Tokyo, Japan

[21] Appl. No.: 822,303

[22] PCT Filed: May 9, 1985

[86] PCT No.: PCT/JP85/00261

§ 371 Date: Dec. 30, 1985

§ 102(e) Date: Dec. 30, 1985

[87] PCT Pub. No.: WO85/05510

PCT Pub. Date: Dec. 5, 1985

[30] Foreign Application Priority Data

May 10, 1984 [JP] Japan ............................ 59-93729

[51] Int. Cl.$^4$ ...................... H03H 1/00; H03H 5/00
[52] U.S. Cl. ................................... 323/354; 323/370
[58] Field of Search ............... 323/209, 297, 353–354, 323/364, 369–370

[56] References Cited

U.S. PATENT DOCUMENTS

| 3,930,304 | 1/1976 | Keller et al. | 323/354 X |
| 4,016,483 | 4/1977 | Rudin | 323/354 |
| 4,150,366 | 4/1979 | Price | 323/354 X |
| 4,201,970 | 5/1980 | Onyshkevych | 323/354 X |
| 4,412,241 | 10/1983 | Nelson | 323/354 X |

FOREIGN PATENT DOCUMENTS 47-19052  6/1972  Japan.
56-21246  5/1981  Japan.

Primary Examiner—Peter S. Wong
Attorney, Agent, or Firm—Lewis H. Eslinger; Alvin Sinderbrand

[57] ABSTRACT

This invention relates to a method for adjusting an electronic circuit used for a television receiver and the like when it is adjusted upon being manufactured, in which connection wires (17) and (18), which can be melt-cut by flowing a current thereto from the outside, are previously connected in series or in parallel to adjusting elements (12) and (13) inserted into a predetermined current path within an electronic circuit (10); the operation state of the electronic circuit (10) is detected by a detector circuit (5); on the basis of the detected result, it is judged whether the connection wires (17) and (18) are melt-cut or not; and under the necessary state, the connection wires (17) and (18) are melt-cut by flowing the current thereto from the outside, whereby a semi-fixed resistor is omitted, the reliability thereof after adjustment can be improved and the adjustment itself can be simplified, thus reducing the adjusting time.

14 Claims, 6 Drawing Figures

METHOD FOR ADJUSTING AN ELECTRONIC CIRCUIT

DESCRIPTION

1. Technical Field

This invention relates to a method for adjusting an electronic circuit used for a television receiver or the like when it is adjusted upon being manufactured.

2. Background Art

In an electronic circuit for use in a television receiver and so on, the characteristic thereof is normally changed and adjusted by finely adjusting a magnitude of a current flowing through such circuit. In that case, it is generally carried out that the electronic circuit is set in the driving (operating) mode and under this state, by rotating a semi-fixed resistor inserted into the circuit, the voltage and the like at a necessary operation point are adjusted so as to fall within a standardized range.

According to this method, since the variation in valve of the semi-fixed resistor itself is large, even if the adjusting angle of the semi-fixed resistor is determined, the characteristics of all the electronic circuits can not always fall within the standardized values. For this reason, the rotational adjustment must be carried out in each electronic circuit, requiring a relatively long time of about 20 seconds for one adjustment. Further, since the semi-fixed resistor is of a so-called movable type, after the adjustment, the rotational angle may be changed due to the vibration, contact and so on. Accordingly, upon transportion and the like thereof, there is such a defect to pay a notice that this semi-fixed resistor is not touched, etc.

In view of the above mentioned aspect, this invention is to omit the semi-fixed resistor to thereby improve the reliability of the electronic circuit after it was adjusted and also is to simplify the adjustment itself to thereby reduce the adjusting time.

DISCLOSURE OF INVENTION

According to the present invention, a connection line, which can be melt-cut by flowing a current thereto from the outside, is connected in series or in parallel to an adjusting element inserted into a predetermined current path within an electronic circuit; under a predetermined driving state of the electronic circuit, the operation state of this electronic circuit is detected by a detector circuit; on the basis of the detected result, it is judged whether the connection line is melt-cut or not; under the necessary state, the current is supplied to the connection wire from the outside to melt-cut the same; and a semi-fixed resistor is omitted, whereby the reliability after the adjustment is improved and also the adjustment itself is simplified, thus reducing the adjusting time.

BEST MODE FOR CARRYING OUT THE INVENTION

An embodiment of a method for adjusting an electronic circuit according to the present invention will hereinafter be described with reference to the drawings.

Figure 1:
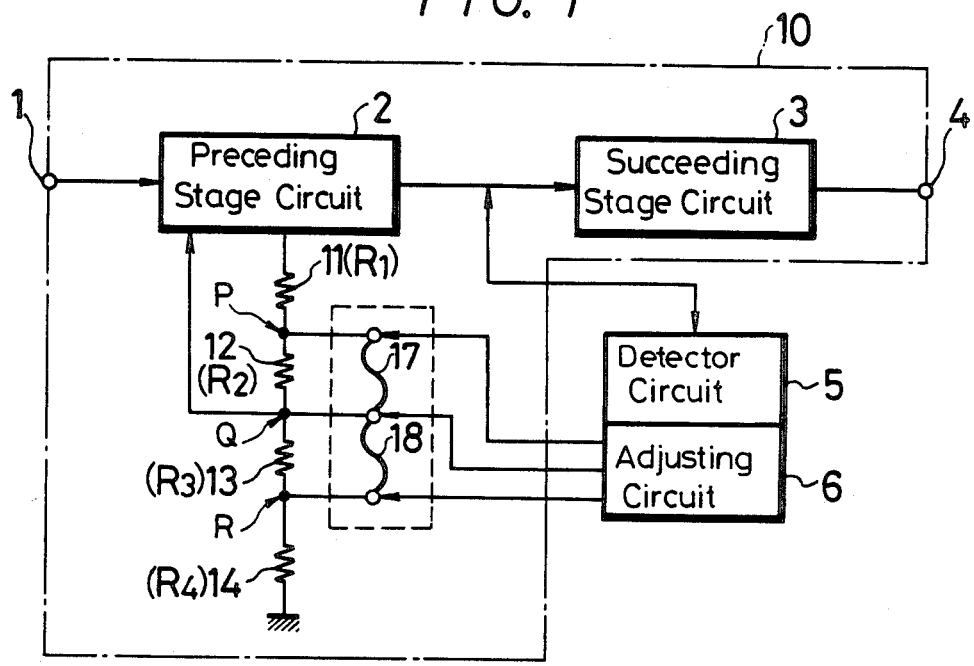
FIG. 1 is a block diagram useful for explaining an embodiment of a method for adjusting an electronic circuit according to the present invention.

In FIG. 1, reference numeral 1 designates a signal input terminal, 2 a preceding stage circuit, 3 a succeeding stage circuit and 4 a signal output terminal. To a DC power source such as a drive power supply source and the like in the preceding stage circuit 2, four resistors 11, 12, 13 and 14 are connected in series. The connection point between the resistors 12 and 13 is connected to a predetermined point of the preceding stage circuit 2. In that case, the resistors 12 and 13 become adjusting elements and the resistance values thereof are selected to be extremely low as compared with other resistors 11 and 14. By way of example, respective resistance values $R_1$, $R_2$, $R_3$ and $R_4$ of the resistors 11, 12, 13 and 14 are 200 K $\Omega$, 200 $\Omega$, 300 $\Omega$ and 300 K $\Omega$, respectively. An electronic circuit 10 is constructed as described above. The connection points among the respective resistors are denoted by P, Q and R, respectively.

Figure 2:
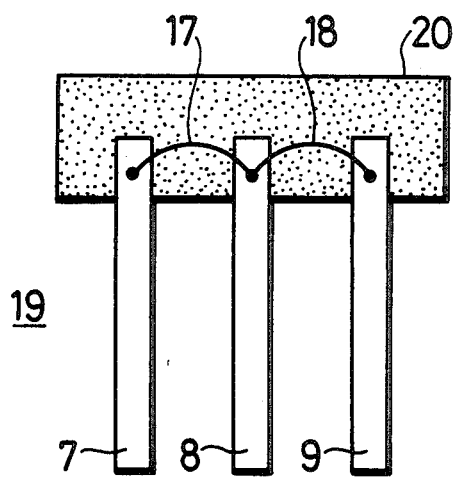
FIG. 2 is a cross-sectional view illustrating an example of an element used in the present invention.

Connection wires 17 and 18 are previously connected in parallel to the resistors 12 and 13 which become the adjusting elements, respectively. FIG. 2 illustrates an element 19 which incorporates therein the connection wires 17 and 18. The connection wires 17 and 18 are connected between one ends of three terminal 7, 8 and 9 made of conductive material and this portion is molded by a mold material 20 such as resin and so on. As the connection wires 17 and 18, there can be used such one which an easily be melt-cut by the current flowed thereto. In practice, such a connection wire is suitable which can easily be melt-cut by a current of 2A (about 0.6 V) for a time period of 2 m sec. In this case, as the connection wires 17 and 18, it is desirable to use such a connection wire having a resistance value of, for example, about 0.22 $\Omega$.

Turning back to FIG. 1, the terminals 7, 8 and 9 of the above mentioned element 19 are previously connected (soldered) to the aforesaid points P, Q and R of the electronic circuit 10, respectively. After the adjustment which will be described later, they are not removed. Accordingly, on a printed circuit board, this element 19 is mounted together with other electronic parts, too.

Next, the adjusting method will be described. As shown in FIG. 1, there are provided a detector circuit 5 and an adjusting circuit 6. A measuring terminal (electrode) of the detector circuit 5 is connected to a required point to be measured (the connection point between the preceding stage circuit 2 and the succeeding stage circuit 3, in this embodiment) of the electronic circuit 10 and lead wires from the adjusting circuit 6 are respectively connected to the aforesaid points P, Q and R.

Then, the electronic circuit 10 is set in the driving (operating) state and the operating state (characteristic and the like) of the electronic circuit 10 is checked by the detector circuit 5. If the electronic circuit is in its normal operating state, the connection wires 17 and 18 are not melt-cut but are left as they are. Therefore, at that time, the resistors 12 and 13 are in the short-circuited state, respectively.

If under this operation state such a result is obtained by makng the resistance value at the ground side from the point Q be slightly larger, a current is supplied to the connection wire 18 from the adjusting circuit 6 to thereby melt-cut this connection wire. In the case reverse to the above, it is enough that the connection wire 17 is melt-cut. Alternatively, if it is better that both the resistors 12 and 13 are used is better, then both the connection wires 17 and 18 are melt-cut.

While the supply of the current from the adjusting circuit 6 may be manually carried out on the basis of the detected result by the detector circuit 5, it may be possible that the supply of the current is automatically carried out by controlling the adjusting circuit 6 on the basis of a command signal issued from the detector circuit 5.

Even when the prior art semi-fixed resistor is used, since the practical variable range of the resistance value is very small as compared with the whole resistance value (the resistance value between the point Q and the ground in FIG. 1), if the resistance values of the respective resistors are set to be satisfactory values, the satisfactory adjustment can be brought about by either of the connection and disconnection of the connection wires as seen in the above mentioned example.

According to the present invention as set forth above, since under the operation state of the electronic circuit 10 the necessary connection wire 17 or 18 or both of them are only melt-cut on the basis of the detected result by the detector circuit 5, it is possible to carry out the adjustment of the so-called electronic circuit very easily and for an extremely short time of period (several milli seconds). Accordingly, even when the adjusting operation is carried out in each electronic circuit 10, it hardly takes a long time of period for such adjustment. Further, although the semi-fixed resistor tends to easily vary its resistance value due to the invasion of dusts, water and so on or because it has a movable portion, according to the method of the present invention, since such semi-fixed resistor is not required, even after it was adjusted, the resistance value thereof is not changed, thus increasing the reliability.

Figure 3:
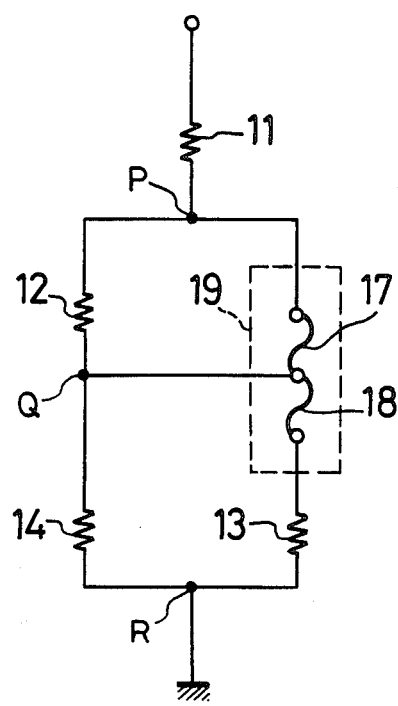
FIGS. 3, 4, 5 and 6 are cross-sectional views illustrating main parts of other embodiments of the present invention, respectively.

FIG. 3 illustrates another embodiment of the present invention. In this embodiment, except for the fact that the resistor 13 as the adjusting element is connected in series to the connection wire 18, other circuit elements are connected in the same way as those of FIG. 1. The respective resistance values $R_1$, $R_2$, $R_3$ and $R_4$ for the resistors 11, 12, 13 and 14 are selected to be 50 K $\Omega$, 270 $\Omega$, 33 K $\Omega$ and 4.7 K$\Omega$, respectively. In this embodiment, under the illustrated state, the resistor 12 is short-circuited and the resistors 14 and 13 are connected in parallel to each other, so that the resistance value between the points P and Q is zero and that the resistance value between the points Q and R is 4114 $\Omega$ which is slightly lower than 4700 $\Omega$. If under such state either the connection wire 17 or 18 or both of them are melt-cut the respective resistance values to the ground side and to the opposite side from the point Q and be adjusted finely.

Figure 4:
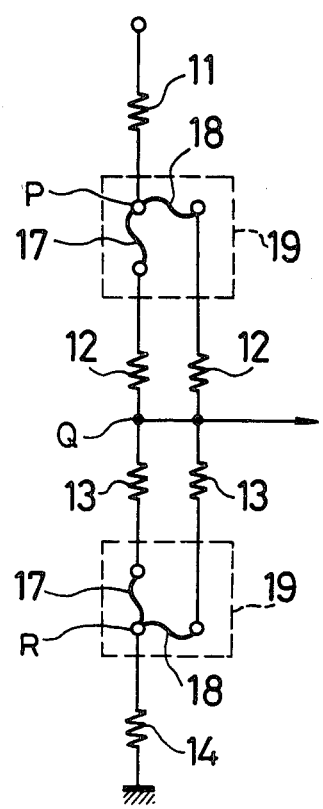

FIG. 4 shows a further embodiment of the present invention. In this embodiment, two routes are provided for the P-Q-R path and the above mentioned connection wires 17 and 18 are interposed in the routes, in which the two routes are both used or either of them is used, selectively.

Figure 5:
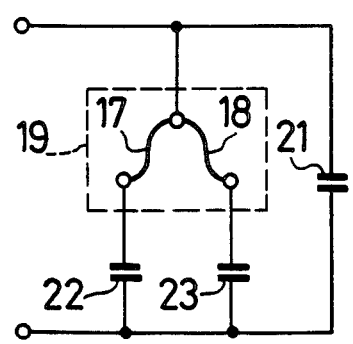

FIG. 5 shows a further embodiment in which capacitors 22 and 23 as the adjusting elements are connected in parallel to a capacitor 21 via the connection wires 17 and 18. In this case, the capacity value can be adjusted by melt-cutting the connection wires 17 and 18 in the manner similar to the above.

Figure 6:
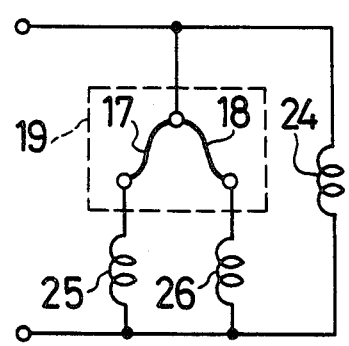

FIG. 6 shows a further embodiment in which coils 25 and 26 as the adjusting elements are connected in parallel to a coil 24 via the connection wires 17 and 18. Also in FIG. 6, the inductance value can be adjusted by melt-cutting the connection wires 17 and 18 similarly as described above.

While in the above mentioned embodiments the adjusting elements and the connection wires therefor are independently provided, such a version may be possible that a bonding wire used for the interconnection of a semiconductor is used as the connection wire, the adjusting element is provided in parallel to this bonding wire, they are molded integrally and terminals are led out from one and another ends of the molded member. While the above mentioned connecting wires 17 and 18 are molded by the mold material, of course, they may be connected discretely.

It is needless to say that the present invention is not limited to the aforesaid embodiments but can take various modifications without departing from the gist of the invention.

I claim:

1. A method for adjusting an electronic circuit characterized by the steps of connecting a connection wire, which can be melt-cut by flowing a current thereto from a current source external to the electronic circuit, in series or in parallel to an adjusting element provided within a predetermined current path of the electronic circuit; operating the electronic circuit to reach a predetermined operation state thereof; detecting a parameter in the operation state of said electronic circuit by a detector circuit; judging on the basis of a detected result from the detector circuit whether said connection wire is to be melt-cut or not; and upon judging a necessary state, melt-cutting said connection wire by supplying the current thereto from the current source, thereby adjusting said electronic circuit.

2. A method for adjusting an electronic circuit according to claim 1, characterized by the further steps of providing the electronic circuit with a plurality of interconnected electronic sub-circuits and detecting the parameter at a selected junction between the sub-circuits.

3. A method for adjusting an electronic circuit according to claim 1 or 2, characterized by the step of providing said adjusting element as a resistor element.

4. A method for adjusting an electronic circuit according to claim 1 or 2, characterized by the step of providing said adjusting element as a capacity element.

5. A method for adjusting an electronic circuit according to claim 1 or 2, characterized by the step of providing said adjusting element as an inductance element.

6. A method for adjusting an electronic circuit according to claim 1, characterized by the further steps of providing an element housing and locating therein a connection wire used as said connection wire which can be melt-cut by externally flowing a current thereto.

7. A method for adjusting an electronic circuit according to claim 6, characterized by the step of providing said element housing and the connection wire located therein which can be melt-cut by flowing the current thereto from the outside with three terminals.

8. Apparatus for adjusting an electronic circuit in an operating state, comprising a connection wire, which can be melt-cut by flowing a current thereto from a current source external to the electronic circuit, said connection wire being electrically connected to an impedance adjusting element present in a predetermined current path of the electronic circuit; a detector circuit connected to the electronic circuit for detecting an operating parameter thereof, whereby on the basis of a detected value of said parameter said detector circuit produces a command signal; and an adjusting circuit connected to said connection wire and the current source external to the electronic circuit and being operable in response to said command signal to melt-cut said connection wire by supplying external current thereto, thereby adjusting said electronic circuit.

9. Apparatus for adjusting an electronic circuit according to claim 8, in which the electronic circuit includes a plurality of functional sub-circuits and further comprising means for connecting said detector circuit to a junction between selected ones of said sub-circuits.

10. Apparatus for adjusting an electronic circuit according to claim 8, characterized in that said adjusting element is a resistor element.

11. Apparatus for adjusting an electronic circuit according to claim 8, characterized in that said adjusting element is a capacitive element.

12. Apparatus for adjusting an electronic circuit according to claim 8, characterized in that said adjusting element is an inductance element.

13. Apparatus for adjusting an electronic circuit according to claim 8, further comprising an element housing have arranged therein said connection wire which can be melt-cut by externally flowing a current thereto.

14. Apparatus for adjusting an electronic circuit according to claim 13, characterized in that said element housing having arranged therein the connection wire which can be melt-cut by externally flowing the current thereto includes three external connection terminals.

* * * * *